US008589068B2

(12) United States Patent
Kato et al.

(10) Patent No.: US 8,589,068 B2
(45) Date of Patent: Nov. 19, 2013

(54) NAVIGATION APPARATUS AND NAVIGATION METHOD

(75) Inventors: Takayuki Kato, Osaka (JP); Hiroaki Honda, Osaka (JP)

(73) Assignee: KYOCERA Corporation, Kyoto (JP)

( * ) Notice: Subject to any disclaimer, the term of this patent is extended or adjusted under 35 U.S.C. 154(b) by 302 days.

(21) Appl. No.: 12/922,138

(22) PCT Filed: Mar. 13, 2009

(86) PCT No.: PCT/JP2009/054866
§ 371 (c)(1),
(2), (4) Date: Dec. 9, 2010

(87) PCT Pub. No.: WO2009/116464
PCT Pub. Date: Sep. 24, 2009

(65) Prior Publication Data
US 2012/0029816 A1    Feb. 2, 2012

(30) Foreign Application Priority Data

Mar. 17, 2008  (JP) ................................. 2008-067882

(51) Int. Cl.
*G01C 21/34* (2006.01)
(52) U.S. Cl.
USPC ........... 701/436; 701/438; 701/454; 701/532; 340/995.19; 340/995.24
(58) Field of Classification Search
USPC ......... 701/408–412, 431, 436, 438, 454, 532, 701/533; 455/456.6, 550.1; 340/995.1, 340/995.14, 995.17, 995.19, 995.24
See application file for complete search history.

(56) References Cited

U.S. PATENT DOCUMENTS

| | | | |
|---|---|---|---|
| 6,850,844 B1 * | 2/2005 | Walters et al. | 701/410 |
| 6,914,521 B2 * | 7/2005 | Rothkop | 340/425.5 |
| 7,245,216 B2 * | 7/2007 | Burkley et al. | 340/539.13 |

(Continued)

FOREIGN PATENT DOCUMENTS

| | | |
|---|---|---|
| JP | 10-339647 | 12/1998 |
| JP | 2002-328031 | 11/2002 |

(Continued)

OTHER PUBLICATIONS

Zhang et al, A Context Aware Automatic Traffic Notification System for Cell Phones, 27th International Conference on Distributed Computing Systems Workshops, 2007, pp. 1-3.*

(Continued)

*Primary Examiner* — Russell Frejd
(74) *Attorney, Agent, or Firm* — Procopio,Cory, Hargreaves & Savitch LLP (57) ABSTRACT

In order to notify a user that a facility is present in the neighborhood of a route to a destination, a mobile phone includes a location obtaining portion to obtain a present location (S03, S09), a destination setting portion to set a point of destination (S02), a departure point setting portion to set a point of departure (S04), a facility extraction portion to extract facility information of a facility located in the neighborhood of a route from the point of departure to the destination from among facility information included in map information (S08), and a light emission control portion to give notification at a prescribed timing if at least one facility information is extracted by the facility extraction portion (S14).

15 Claims, 6 Drawing Sheets

(56) References Cited

U.S. PATENT DOCUMENTS

| | | | |
|---|---|---|---|
| 7,583,901 B2* | 9/2009 | Nakagawa et al. | 398/183 |
| 7,865,306 B2* | 1/2011 | Mays | 701/437 |
| 7,873,906 B2* | 1/2011 | Womack | 715/730 |
| 8,023,963 B2* | 9/2011 | Yonker et al. | 455/456.1 |
| 2004/0030741 A1* | 2/2004 | Wolton et al. | 709/202 |
| 2004/0047244 A1* | 3/2004 | Iino et al. | 368/276 |
| 2004/0090317 A1* | 5/2004 | Rothkop | 340/435 |
| 2005/0040224 A1* | 2/2005 | Brinton et al. | 235/376 |
| 2006/0178810 A1* | 8/2006 | Hashima et al. | 701/200 |
| 2007/0061245 A1* | 3/2007 | Ramer et al. | 705/37 |
| 2007/0067097 A1* | 3/2007 | Haatainen | 701/208 |
| 2007/0118281 A1* | 5/2007 | Adam et al. | 701/211 |
| 2007/0205875 A1* | 9/2007 | De Haan | 340/425.5 |
| 2008/0201074 A1* | 8/2008 | Bleckman et al. | 701/211 |
| 2009/0029687 A1* | 1/2009 | Ramer et al. | 455/414.3 |
| 2009/0186633 A1* | 7/2009 | Yonker et al. | 455/456.6 |

FOREIGN PATENT DOCUMENTS

| | | |
|---|---|---|
| JP | 2004-347634 A | 9/2004 |
| JP | 2005-274482 A | 10/2005 |
| JP | 2006-003269 A | 1/2006 |
| JP | 2006-162275 | 6/2006 |
| JP | 2006-258466 | 9/2006 |
| JP | 2006-259419 A | 9/2006 |
| JP | 2007-085996 | 4/2007 |
| JP | 2007-257208 A | 4/2007 |
| JP | 2008-076368 A | 4/2008 |

OTHER PUBLICATIONS

Report on Pretrial Examination attached to Questioning for Appeal Trial dated Aug. 30, 2011, issued in counterpart Korean Application No. 2008-067882.

Notice of Ground of Rejection issued in the corresponding Japanese Patent Application No. 2008-067882 dated Sep. 14, 2010.

International Search Report issued in PCT/JP2009/054866, on Jun. 9, 2009, 4 pages.

Notice of Ground of Rejection dated Aug. 28, 2012, issued in counterpart Japanese Application No. 2010-128541.

\* cited by examiner

| | FACILITIES REGISTRATION | |
|---|---|---|
| ☑ | CONVENIENCE STORE | (RED) |
| ☐ | HOSPITAL | (BLUE) |
| ☐ | GAS STATION | (GREEN) |
| ☐ | RESTAURANT | (YELLOW) |

NAVIGATION APPARATUS AND NAVIGATION METHOD

TECHNICAL FIELD

The present invention relates to a navigation apparatus and a navigation method, and more particularly to a navigation method with a GPS function and a navigation method.

BACKGROUND ART

In recent years, mobile phones with a GPS (Global Positioning System) function have appeared, which communicate with a server to obtain service provided by the server to find a route from a point of departure to a destination. In use of such service, users visually check map information displayed on a display mounted on a mobile phone while moving from a point of departure to a point of destination and can reach the destination with assistance of voice guidance, if necessary.

On the other hand, a map includes essential facilities such as convenience stores and gas stations, in addition to route information. Users often wish to drop in at desired facilities on the way to the destination using the navigation function of mobile phones. A technique of displaying a facility included in a map is disclosed in Japanese Patent Laying-Open No. 2002-328031 (Patent Document 1), though not being directed to a mobile phone. A navigation apparatus disclosed in Japanese Patent Laying-Open No. 2002-328031 includes a facility information storage means for storing facility information including the address or the type of a neighboring facility, a search condition input means for inputting a predetermined search condition through a user's operation, a search means for searching for said neighboring facility that satisfies said search condition input by said search condition input means, based on said facility information stored in said facility information storage means, a search result graphic means for generating search result graphic data in which, for said neighboring facility within a predetermined range that is extracted through a search by said search means, a type mark corresponding to said type is arranged corresponding to an approximate location of the address, and a display means for displaying a search result based on the search result graphic data generated by said search result graphic means.

However, the user has to watch the map displayed on the display mounted on the mobile phone and visually check the location of the facility while moving. A display on a mobile phone has a problem in that it is difficult to recognize the displayed map and the locations of essential facilities on the course of the route, because the display area is smaller than that of a display mounted on a car navigation apparatus and because the resolution or contrast of the display is limited. Therefore, the user may move ahead to a wrong direction or may miss the essential facilities without being aware of their existence even if they are located in the user's proximity. In particular, during the night when the environment is dark, it is difficult to check the map displayed on the display, because the backlight which illuminates the display turns off after a lapse of a prescribed time in order to reduce battery consumption.

PATENT DOCUMENT 1

Japanese Patent Laid-Open No. 2002-328031

DISCLOSURE OF THE INVENTION

Problems to be Solved by the Invention

The present invention is made to solve the aforementioned problem. An object of the present invention is to provide a navigation apparatus capable of notifying users that facilities are present in the neighborhood of a route to a destination.

Another object of the present invention is to provide a navigation method capable of notifying users that facilities are present in the neighborhood of a route to a destination.

Means for Solving the Problems

In order to achieve the aforementioned object, in accordance with an aspect of the present invention, a navigation apparatus includes: a location obtaining portion to obtain a present location; a destination point setting portion to set a point of destination; a departure point setting portion to set a point of departure; a facility extraction portion to extract facility information of a facility located in a neighborhood of a route from the point of departure to the point of destination from among facility information included in map information; and a notification portion to give notification at a prescribed timing if at least one facility information is extracted by the facility extraction portion.

In accordance with this aspect, the facility information of the facility located in the neighborhood of the route from the point of departure to the point of destination is extracted from among the facility information included in the map information, and if at least one facility information is extracted, notification is given at a prescribed timing. Therefore, notification of the presence of a facility is given at a prescribed timing, so that the user can know the presence of a facility without watching a map. As a result, it is possible to provide a navigation apparatus capable of notifying the user that a facility is present in the neighborhood of the route to the destination.

Preferably, the notification portion gives visual notification.

In accordance with this aspect, visual notification of the presence of a facility is given at a prescribed timing, so that the user can visually know the presence of a facility. This prevents, for example, an influence on people around which would be given by voice notification.

Preferably, the notification portion gives notification on condition that at least one facility determined by the extracted facility information is located in an area determined based on the obtained present location in a map included in the map information.

In accordance with this aspect, notification is given at a timing when a facility comes into an area defined based on the present location, so that the user can immediately drop in at the facility in the user's proximity.

Preferably, the notification portion gives notification on condition that at least one facility information that satisfies a prescribed condition exists in the extracted facility information.

Preferably, the prescribed condition is to be located in a prescribed range from the point of departure or the point of destination.

In accordance with this aspect, notification may be given only when the facility desired by the user among a plurality of facilities is present.

Preferably, the navigation apparatus further includes an instruction accepting portion to accept a user's instruction. The notification portion gives notification on condition that the facility information is extracted by the facility extraction portion, in response to acceptance of a first instruction by the instruction accepting portion.

In accordance with this aspect, notification is given when the first instruction is accepted, so that the user can be notified of the presence of the facility at the timing desired by the user. The user can be notified especially in urgent need.

Preferably, the navigation apparatus further includes: a facility obtaining portion to obtain map information including the obtained present location and a facility in response to acceptance of a second instruction by the instruction accepting portion, if the facility information is not extracted by the facility extraction portion; and a display control portion to display a map included in the obtained map information.

In accordance with this aspect, if a facility is not present in the neighborhood of the route from the departure point to the destination, map information including a facility located in the neighborhood of the present location is obtained, and a map is displayed. Therefore, even when a facility is not present in the neighborhood of the route from the present location to the destination, the user can be notified of the location of the facility close to the present location.

Preferably, the navigation apparatus further includes: a first casing; a second casing coupled to the first casing so as to be freely opened and closed; and a display control portion to display an area determined based on the obtained present location in a state in which the first casing and the second casing are open and to stop display of the area determined based on the obtained present location in a state in which the first casing and the second casing are closed.

In accordance with this aspect, an area defined based on the present location is displayed in the state in which the first casing and the second casing are open. Therefore, a map can be displayed by a simple operation of changing to the state in which the first casing and the second casing are open. On the other hand, display of the area defined based on the present location is stopped in the state in which the first casing and the second casing are closed, thereby reducing power consumption.

Preferably, the display control portion displays the area determined based on the obtained present location in a prescribed display manner, in the open state.

Preferably, the prescribed display manner includes three-dimensional display, display in an enlarged view, and a photograph.

Preferably, the display control portion includes a marking portion to mark the at least one facility.

Preferably, the notification portion includes a light emission portion to emit light and a light emission control portion to allow the light emission portion to blink at intervals determined based on a distance between the obtained present location and a facility determined by the facility information extracted by the facility extraction portion.

Preferably, the navigation apparatus further includes a display control portion to display an area determined based on the obtained present location. The light emission portion is provided separate from the display portion.

Preferably, the notification portion includes a light emission portion capable of emitting light of multiple colors and a light emission control portion to allow the light emission portion to emit light in a predetermined color corresponding to a kind of facility determined by the facility information extracted by the facility extraction portion.

Preferably, the light emission control portion allows the light emission portion to blink at intervals determined based on a distance between the obtained present location and a facility determined by the facility information extracted by the facility extraction portion.

Preferably, the navigation apparatus further includes a display control portion to display an area determined based on the obtained present location. The light emission portion is provided separate from the display portion.

In accordance with another aspect of the present invention, a navigation method includes the steps of: obtaining a present location; accepting a point of destination; setting a point of departure; extracting facility information located in a neighborhood of a route from the point of departure to the point of destination from among facility information included in map information; and giving notification at a prescribed timing, if at least one facility information is extracted as a result of extraction.

In accordance with this aspect, it is possible to provide a navigation method capable of notifying the user that a facility is present in the neighborhood of the route to the destination.

DESCRIPTION OF REFERENCE CHARACTERS 1 mobile phone, 2 display-side portion, 3 operation-side portion, 11 first speaker, 12 second speaker, 13 microphone, 21 control portion, 22 communication circuit, 22A antenna, 24 camera, 27 card I/F, 27A flash memory, 28 codec portion, 37 multicolor LED, 38 GPS sensor, 39 open switch, 40 close switch, 101 present location obtaining portion, 101 obtaining portion, 101 present location obtaining portion, 103 destination point setting portion, 105 departure point setting portion, 107 map information obtaining portion, 109 facility extraction portion, 111 facility condition setting portion, 113 display area extraction portion, 115 determination portion, 117 distance calculation portion, 119 light emission control portion, 121 display control portion, 123 marking portion, 125 state detection portion, 127 instruction accepting portion, 129 facility obtaining portion.

BEST MODES FOR CARRYING OUT THE INVENTION

In the following, an embodiment of the present invention will be described with reference to the figures. In the following description, the same parts are denoted with the same reference numerals. Their names and functions are also the same. Therefore, a detailed description thereof will not be repeated.

Figure 1A:
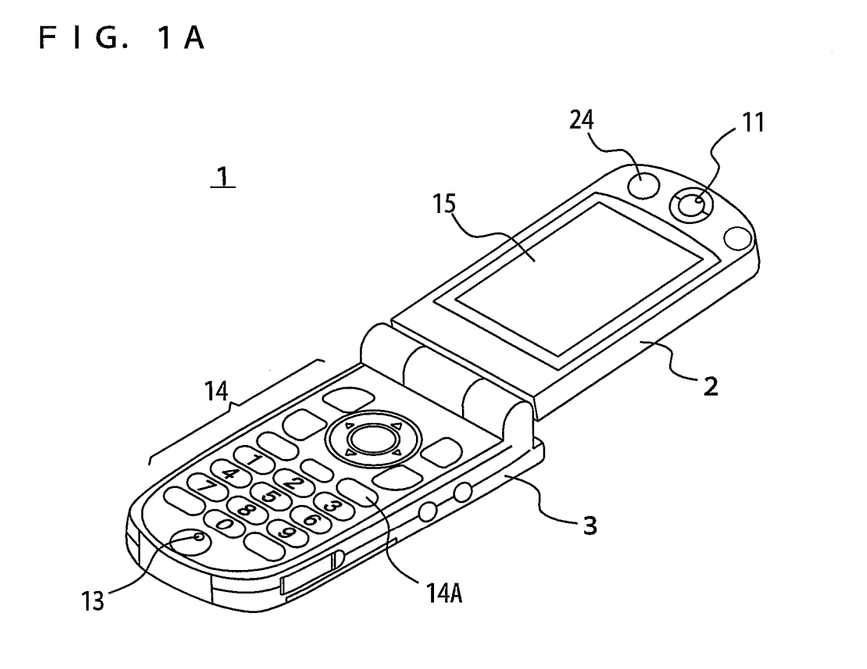
FIG. 1A is a perspective view showing an external view of a mobile phone in an open style.
Figure 1B:
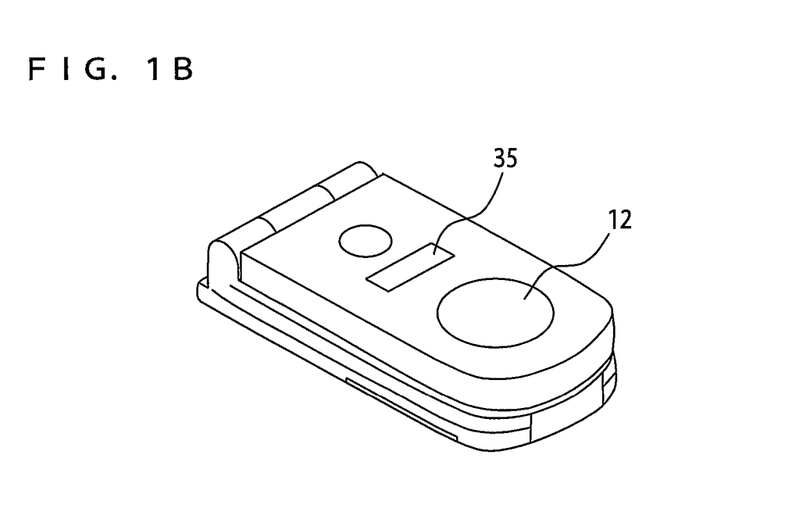
FIG. 1B is a perspective view showing an external view of a mobile phone in a closed style.

FIG. 1A and FIG. 1B are perspective views showing an external view of a mobile phone in an embodiment of the present invention. A mobile phone 1 is an example of the navigation apparatus. FIG. 1A shows an external view of a mobile phone in an open style and FIG. 1B shows an external view of a mobile phone in a closed style. Referring to FIG. 1A and FIG. 1B, mobile phone 1 includes an operation-side portion 3 and a display-side portion 2.

Operation-side portion 3 includes a power key 14A, operation key 14 including ten keys, a call key and the like, and a microphone 13 arranged on the inner surface thereof. Display-side portion 2 includes a liquid crystal display (LCD) 15, a first speaker 11 as a receiver, and a camera 24 arranged on the inner surface thereof, and includes a multicolor LED 35 and a second speaker 12 arranged on the outer surface thereof.

Although mobile phone 1 shown here includes LCD 15, LCD 15 may be replaced by an organic EL (Electro Luminescence) display.

Operation-side portion 3 and display-side portion 2 are rotatably coupled to each other with a hinge mechanism so that operation-side portion 3 and display-side portion 2 can be opened and closed freely. When mobile phone 1 is folded and operation-side portion 3 and display-side portion 2 are in the closed state, mobile phone 1 is in the closed style. When mobile phone 1 is opened and operation-side portion 3 and display-side portion 2 are in the open state, mobile phone 1 is in the open style.

Figure 2:
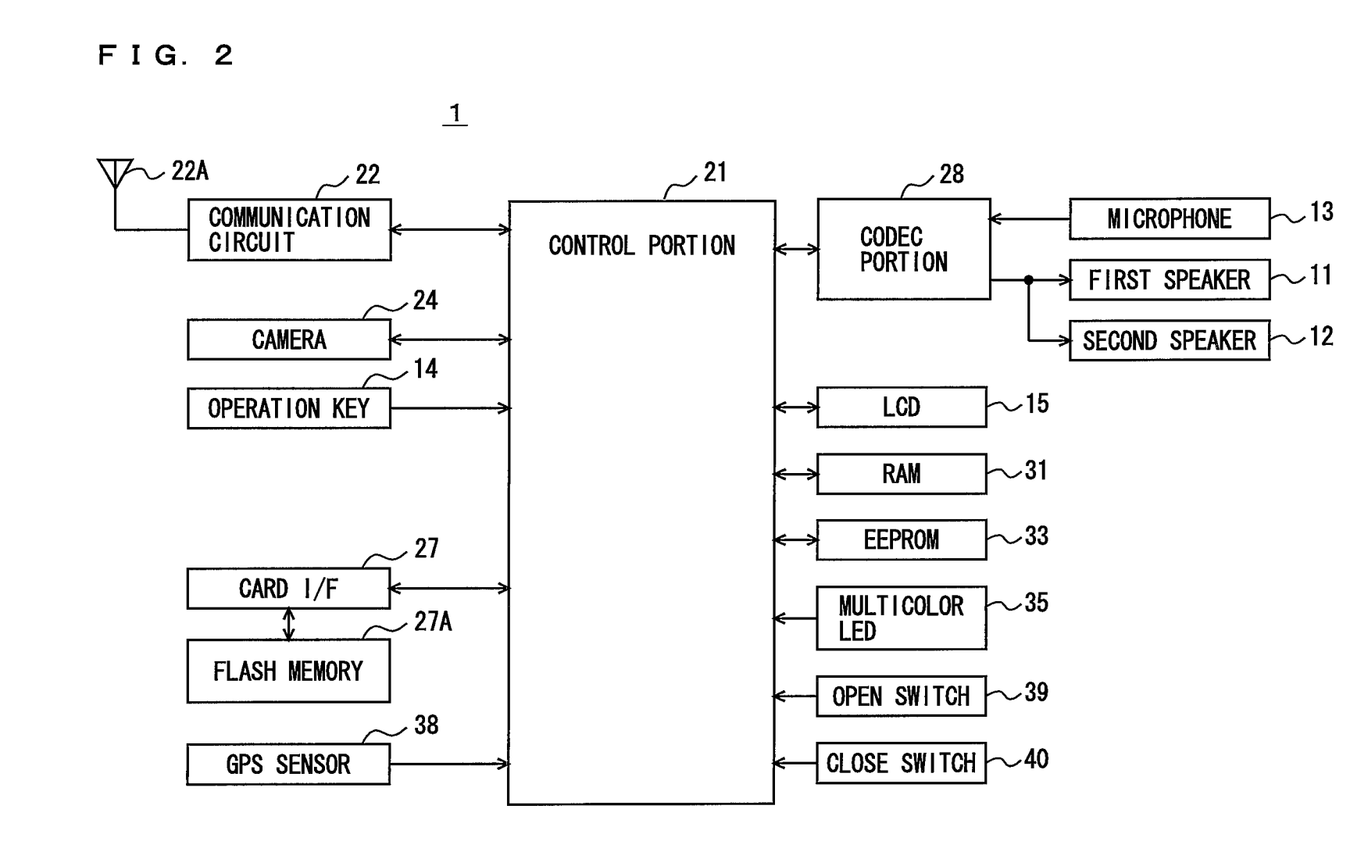
FIG. 2 is a functional block diagram showing an exemplary function of the mobile phone in the present embodiment.

FIG. 2 is a functional block diagram showing an exemplary function of the mobile phone in the present embodiment. Referring to FIG. 2, mobile phone 1 includes a control portion 21 for controlling the entire mobile phone 1, a communication circuit 22 connected to an antenna 22A, a codec portion 28 for processing audio data, and microphone 13, first speaker 11, and second speaker 12, each connected to codec portion 28, and in addition, camera 24, operation key 14 accepting input of operations by the user, an RAM (Random Access Memory) 31 for use as a work area for control portion 21, an EEPROM (Electronically Erasable and Programmable ROM) 33 for storing application programs to be executed by control portion 21, etc., a card interface (I/F) 27, a GPS sensor 38, a multicolor LED (Light Emitting Diode) 35, an open switch 39, and a close switch 40.

Communication circuit 22 connects mobile phone 1 to a network. The network here is a network in a W-CDMA (Wideband Code Division Multiple Access) communication method. Communication circuit 22 wirelessly communicates with a base station apparatus connected to the W-CDMA network. A radio signal transmitted by the base station apparatus is received by antenna 22A. Communication circuit 22 receives the radio signal received by antenna 22A and outputs a signal demodulated from the radio signal to control portion 21. Communication circuit 22 also receives a transmission signal from control portion 21 and outputs a radio signal modulated from the received signal to antenna 22A. A radio signal transmitted from antenna 22A is received by a W-CDMA base station apparatus.

If the signal demodulated from the radio signal input from communication circuit 22 is an audio signal, control portion 21 outputs the audio signal to codec portion 28. Control portion 21 receives the audio signal from codec portion 28 to output the audio signal to communication circuit 22.

Codec portion 28 decodes an audio signal input from control portion 21, converts the decoded digital audio signal into an analog signal, amplifies the analog signal, and then outputs the amplified signal to first speaker 11 or second speaker 12. In addition, codec portion 28 receives an analog audio signal from microphone 13, converts the audio signal into a digital signal, encodes the digital signal, and then outputs the encoded audio signal to control portion 21.

A removable flash memory 27A is attached to card I/F 27. Control portion 21 can access flash memory 27A through card I/F 27. Although, in this example, a program to be executed by control portion 21 is stored in EEPROM 33, the program may be stored in flash memory 27A and may be read from flash memory 27A to be executed by control portion 21.

A recording medium for storing a program is not limited to flash memory 27A and may be a flexible disk, a cassette tape, an optical disk (CD-ROM (Compact Disc-ROM)/MO (Magnetic Optical Disc)/MD (Mini Disc)/DVD (Digital Versatile Disc)), an IC card, an optical card, a semiconductor memory such as a mask ROM, EPROM (Erasable Programmable ROM) or EEPROM (Electronically EPROM), or the like.

Alternatively, mobile phone 1 may be connected to the Internet through communication circuit 22 so that a program is downloaded from a computer connected to the Internet and then executed by control portion 21. Programs referred to herein include not only a program directly executable by control portion 21 but also a source program, a compressed program, an encrypted program, and the like.

Camera 24 includes a lens and an optoelectronic transducer such as a CMOS (Complementary Metal Oxide Semiconductor) sensor to focus light collected by the lens onto the CMOS sensor. The CMOS sensor then optoelectronically converts the received light and outputs image data to control portion 21. Camera 24 is controlled by control portion 21 and starts picking up an image on an instruction from control portion 21 to output the obtained still image data or moving image data to control portion 21.

GPS sensor 38 receives radio waves from a GPS satellite in a Global Positioning System (GPS) and outputs a signal indicating the present location on the map to control portion 21.

Multicolor LED 35 can emit light of multiple colors and is controlled by control portion 21 to emit light of a prescribed color in accordance with an instruction from control portion 21. Multicolor LED 35 is arranged on the outer surface of display-side portion 2 and is thus exposed to the outside of mobile phone 1 when mobile phone 1 is in a closed style (in a closed state). Therefore, even when mobile phone 1 is in the closed style to be carried, the user can visually recognize the light emitted by multicolor LED 35.

Open switch 39 is turned ON when mobile phone 1 is in an open state (open style), and turned OFF when it is not in an open state. Close switch 40 is turned ON when mobile phone 1 is in a closed state (closed style), and turned OFF when it is not in a closed state. Open switch 39 and close switch 40 are connected to control portion 21 so that control portion 21 detects a state of mobile phone 1 by detecting the respective states of open switch 39 and close switch 40. It is noted that one switch may serve as both open switch 39 and close switch 40.

Figure 3:
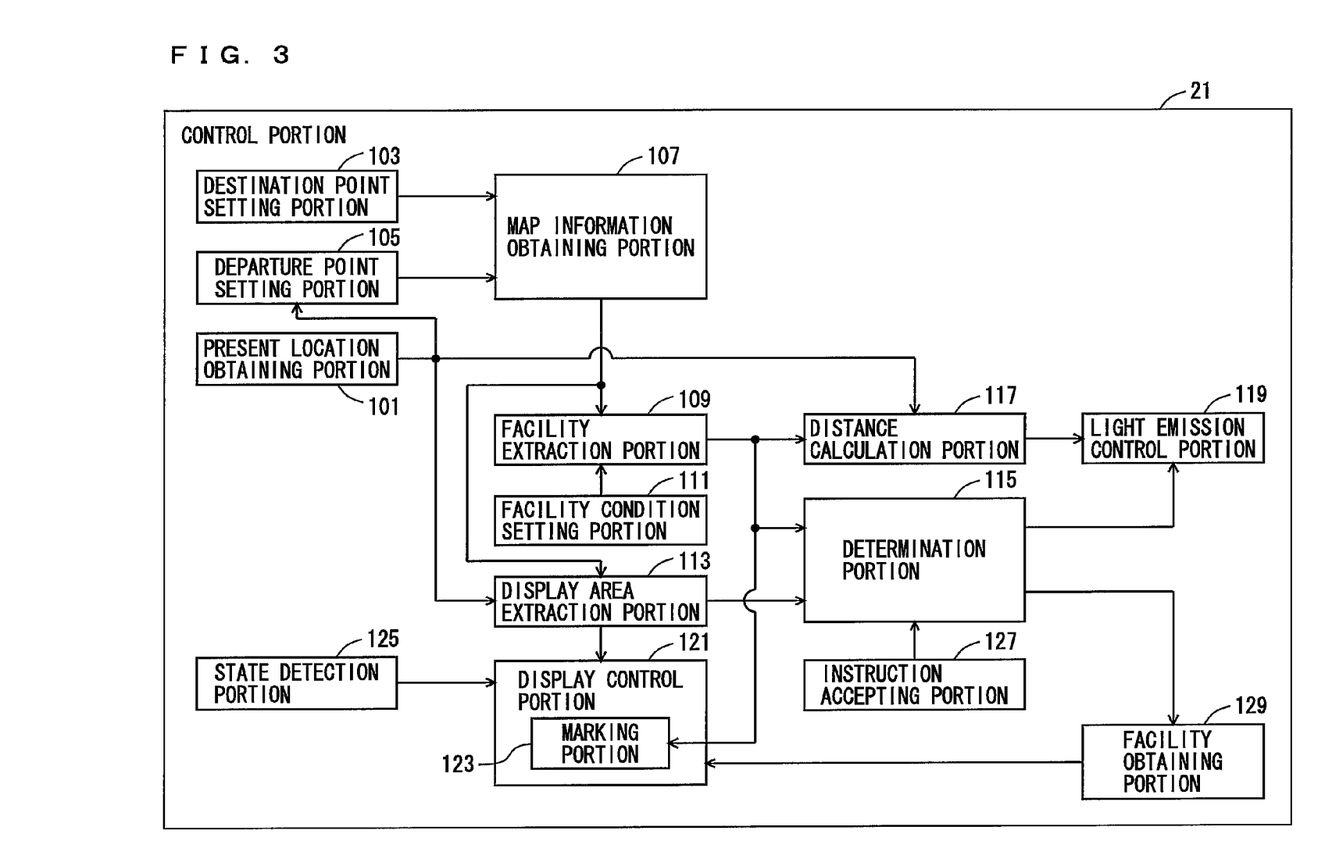
FIG. 3 is a functional block diagram showing a function overview of a control portion of the mobile phone.

FIG. 3 is a functional block diagram showing a function overview of the control portion of mobile phone 1. Referring to FIG. 3, the control portion includes a present location obtaining portion 101 for obtaining the present location, a departure point setting portion 105 for setting a point of departure, a destination point setting portion 103 for setting a point of destination, a map information obtaining portion 107 for obtaining map information including a route from a point of departure to a point of destination, a facility extraction portion 109 for extracting facility information from map information, a facility condition setting portion 111 for setting a condition under which a facility as a process target is extracted, a distance calculation portion 117 for calculating a distance from the present location to a facility, a display area extraction portion 113 for extracting a display area to be displayed on LCD 15, from a map included in the map information, a display control portion 121 for displaying the map in the display area, a state detection portion 125 for detecting a state of mobile phone 1, a determination portion 115, an instruction accepting portion 127 for accepting an instruction by a user, a light emission control portion 119 for controlling multicolor LED 35, and a facility obtaining portion 129 for obtaining new map information based on a result of determination by determination portion 115.

Present location obtaining portion 101 obtains the present location based on a signal received by GPS sensor 38 from a satellite. Present location obtaining portion 101 outputs the obtained present location to departure point setting portion 105, distance calculation portion 117, and display area extraction portion 113. The present location includes, for example, a latitude and a longitude. It is noted that present location obtaining portion 101 may calculate the latitude and longitude from a signal received by GPS sensor 38 from a satellite or may transmit a signal output by GPS sensor 38 to a server connected to the Internet and receive the latitude and longitude sent back from the server.

Destination point setting portion 103 sets a point of destination, and departure point setting portion 105 sets a point of departure. Specifically, when the user allows mobile phone 1 to execute an application program for executing a navigation function, mobile phone 1 receives from a server a map including the present location at the center and displays the map on LCD 15. When the user operates operation key 14 to designate any given point in the map displayed on LCD 15, destination point setting portion 103 sets the designated point as a point of destination. Destination point setting portion 103 outputs the set point of destination to map information obtaining portion 107. Departure point setting portion 105 sets the present location input from present location obtaining portion 101 as a point of departure. Departure point setting portion 105 outputs the set point of departure to map information obtaining portion 107.

Map information obtaining portion 107 asks for route finding from the server and receives map information from the server. The server is a predetermined server for executing a route finding process. The URL (Uniform Resource Locator) of the server is stored beforehand in mobile phone 1. Specifically, map information obtaining portion 107 transmits the point of departure input from departure point setting portion 105 and the point of destination input from destination point setting portion 103, to the server through communication circuit 22, and when communication circuit 22 receives map information from the server, map information obtaining portion 107 obtains the map information from communication circuit 22. The map information includes a map including a route from the point of departure to the point of destination, information indicating the route, and facility information concerning the facilities present in the map. Therefore, the map information includes facility information of the facilities present in the neighborhood of the route from the point of departure to the point of destination. The facility information includes, for example, the names of facilities, the kinds of facilities, and the locations of facilities. Map information obtaining portion 107 outputs the obtained map information to facility extraction portion 109 and display area extraction portion 113. Although a description will made to a case where map information is obtained at one time from the server, by way of example, the map information may be partially obtained from the server. Even in such a case, all the facility information of the facilities present in the neighborhood of the route from the point of departure to the point of destination is obtained. Although in the example here route finding is executed by a predetermined server, for example, the map information may be stored beforehand in EEPROM 33 and control portion 21 may execute route finding.

Facility condition setting portion 111 displays a facility condition setting screen on LCD 15 and sets facility conditions in accordance with an operation input by the user operating operation key 14. Facility condition setting portion 111 temporarily stores the facility conditions in EEPROM 33 and outputs the facility conditions to facility extraction portion 109. The facility conditions here include the kind of facility and the emitted light color.

Figure 4:
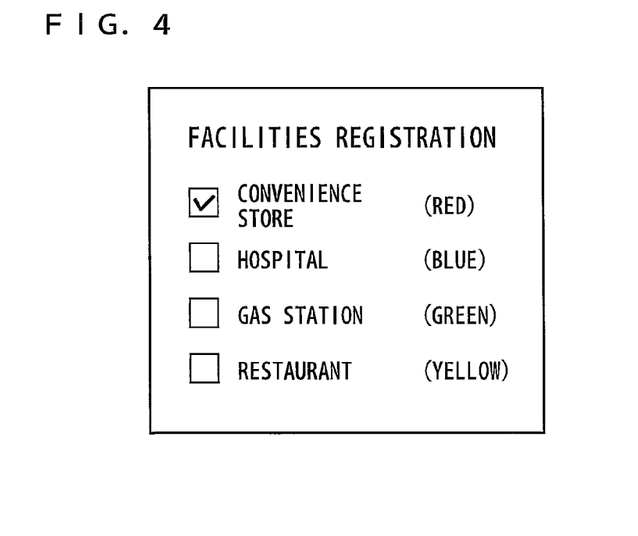
FIG. 4 is an illustration showing an example of a facility condition setting screen.

FIG. 4 is an illustration showing an example of a facility condition setting screen. Referring to FIG. 4, the facility condition setting screen includes a list of kinds of facilities, checkboxes arranged on the left side for individual kinds of facilities, and the emitted light colors arranged on the right side. The emitted light color is predetermined corresponding to each kind of facilities and can be changed in this facility condition setting screen. The example shown here includes, as a pair of the kind of facilities and the emitted light color, a pair of "convenience store" and red, a pair of the kind of facilities indicating hospitals "hospital" and blue, a pair of "gas station" and green, and a pair of "restaurant" and yellow. In the example shown in FIG. 4, the checkbox arranged to the left side of the kind of facilities "convenience store" is checked. This shows that the kind of facilities "convenience store" is set as a facility condition. In the following description, the kind of facilities "convenience store" is set as a facility condition, by way of example.

Returning to FIG. 3, facility condition setting portion 111 can set a condition of choosing a facility present in a prescribed range from either a point of departure or a point of destination, as a facility condition, in addition to the kind of facilities. In this case, facility condition setting portion 111 accepts a choice between a point of departure and a point of destination and outputs the facility condition to facility extraction portion 109. Although here the facility conditions are set using the facility condition setting screen, the facility conditions may be set by default, or the facility conditions may be set using the facility condition setting screen and thereafter stored in EEPROM 33 so that the facility conditions are read from EEPROM 33 once the facility conditions are set.

Facility extraction portion 109 extracts facility information that satisfies the facility conditions from among facility information included in the map information input from map information obtaining portion 107, based on the facility conditions input from facility condition setting portion 111. Here, the facility information in which "convenience store" is set as the kind of facilities is extracted. If the condition of choosing a facility present in a prescribed range from either a point of destination or a point of departure is set as the facility condition, the facility information of the facility present in a range of a predetermined distance from a destination or a point of departure set as a facility condition is extracted from the extracted facility information in which the kind of facilities is "convenience store." Facility extraction portion 109 outputs the extracted facility information to distance calculation portion 117, determination portion 115, and marking portion 123 included in display control portion 121.

Display area extraction portion 113 receives map information from map information obtaining portion 107 and receives the present location from present location obtaining portion 101. Display area extraction portion 113 extracts, as a display area, a prescribed range including the present location at the center from the map included in the map information. The prescribed range is a size that is predetermined as an area to be displayed on LCD 15. If a scale for display is set, the range is extracted in accordance with the scale as a display area. Display area extraction portion 113 receives the present location from present location obtaining portion 101 at prescribed time intervals and extracts a display area each time the present location is input from present location obtaining portion 101. Display area extraction portion 113 outputs the extracted display area to display control portion 121 and determination portion 115 each time it extracts a display area.

Display control portion 121 controls LCD 15 and allows LCD 15 to display an image. Display control portion 121 receives a display area from display area extraction portion 113 to output the received display area to LCD 15 for display. Each time the present location is input from present location obtaining portion 101, display area extraction portion 113 extracts a display area and outputs the extracted display area to display control portion 121, so that a display area is displayed on LCD 15 at prescribed time intervals. Therefore, when the user moves carrying mobile phone 1, a map including the location of the user at the center is displayed on LCD 15 along with the movement.

Display control portion 121 includes marking portion 123. Marking portion 123 places a predetermined mark at the location where a facility present in the display area is arranged. Since a predetermined mark is placed in the image of the display area appearing on LCD 15, the user who watches the image of the map displayed on LCD 15 can know that a facility is present in a prescribed range including the present location at the center.

State detection portion 125 detects the respective states of open switch 39 and close switch 40 to detect a state of mobile phone 1. Specifically, if open switch 39 is ON, it is detected that mobile phone 1 is in the open style, and if close switch 40 is ON, it is detected that mobile phone 1 is in the closed style. State detection portion 125 outputs the detected state to display control portion 121.

If it is detected by state detection portion 125 that the state of mobile phone 1 is the closed style, display control portion 121 stops driving LCD 15. If it is detected by state detection portion 125 that the state of mobile phone 1 is the open style, display control portion 121 drives LCD 15. In other words, when mobile phone 1 is in the open style, a display area is displayed on LCD 15, and when mobile phone 1 is in the closed style, a map is not displayed on LCD 15. This can reduce power consumed by LCD 15. When mobile phone 1 changes the state from the closed style to the open style, the map in the display area appears on LCD 15. Therefore, the user can watch the map only by performing an operation of changing the state of mobile phone 1 to the open style without any special operation.

Determination portion 115 receives a display area from display area extraction portion 113 and receives facility information from facility extraction portion 109. Determination portion 115 determines whether a facility is present in the display area. Specifically, it is determined whether the facility information including a facility located in the display area input from display area extraction portion 113 exists in the facility information input from facility extraction portion 109. If the facility information including a facility located in the display area is extracted from the facility information input from facility extraction portion 109, determination portion 115 determines a color defined by the facility condition corresponding to the kind of facilities included in the extracted facility information. If the facility information is extracted, determination portion 115 outputs a light emission instruction to light emission control portion 119. If such facility information is not extracted, determination portion 115 does not output a light emission instruction to light emission control portion 119. The light emission instruction includes an emitted light color.

Distance calculation portion 117 calculates the distance from the present location input from present location obtaining portion 101 to the closest facility among the facility information input from facility extraction portion 109. Distance calculation portion 117 outputs the calculated distance to light emission control portion 119. Distance calculation portion 117 may calculate a linear distance between the present location and the facility or may calculate the length of the route from the present location to the facility.

Light emission control portion 119 controls multicolor LED 35 in accordance with the light emission instruction input from determination portion 115 to allow multicolor LED 35 to emit light in the emitted light color included in the light emission instruction. In addition, when multicolor LED 35 is allowed to emit light, light emission control portion 119 allows multicolor LED 35 to blink at predetermined intervals corresponding to the distance input from distance calculation portion 117. Since multicolor LED 35 blinks at intervals determined based on the distance, the user can know the distance to the facility from the intervals at which multicolor LED 35 blinks. Furthermore, since multicolor LED 35 blinks in a color defined by the light emission instruction, the user can know the kind of facility from the color in which multicolor LED 35 blinks even when different kinds of facilities are set in the facility conditions. If different kinds of facilities are present, blinking different in colors and intervals may be repeated. If a plurality of multicolor LED 35 are provided, the plurality of multicolor LED 35 may be related to the different kinds of facilities.

When it is detected by state detection portion 125 that the state of mobile phone 1 changes from the closed style to the open style, display control portion 121 displays a display area on LCD 15. Here, if light emission control portion 119 allows multicolor LED 35 to emit light (blink), in other words, if the facility is present in the display area, display control portion 121 changes the display manner of the display area to the one different from the usual. For example, the display area may be three-dimensionally displayed, or the neighborhood of the location of the facility included in the display area may be displayed in an enlarged view. Additionally, a photograph of the facility may be downloaded from the server and displayed. In the case where the facility is present in the display area, when mobile phone 1 changes from the closed style to the open style, the map in the neighborhood of the facility is displayed three-dimensionally in an enlarged view, or the photograph of the facility is displayed, so that the actual facility can be found easily by referring to them.

Instruction accepting portion 127 accepts a search instruction or a find instruction. Specifically, a search instruction and a find instruction are each allocated to any one of a plurality of keys of operation key 14, and instruction accepting portion 127 accepts a search instruction or a find instruction by detecting a press on operation key 14. Here, when one key included in operation key 14 is pressed for a period shorter than a prescribed period, a search instruction is accepted, and when pressed over a prescribed period, a find instruction is accepted. Upon accepting a search instruction or a find instruction, instruction accepting portion 127 outputs the accepted search instruction or find instruction to determination portion 115.

If it is determined that the facility is not present in the display area and if a search instruction is accepted from instruction accepting portion 127, determination portion 115 determines whether facility information is input from facility extraction portion 109. If facility information is input from facility extraction portion 109, a light emission instruction is output to light emission control portion 119. If facility information is not input, a light emission instruction is not output to light emission control portion 119. If the facility is not present in the display area, a mark indicating the facility is not displayed on LCD 15. In this case, if the user operates operation key 14 to input a search instruction, it is determined whether the facility is present on the way to the point of destination. Then, if the facility is present on the way to the point of destination, multicolor LED 35 blinks at intervals determined in accordance with the distance to the facility. Therefore, even when the facility is not present in the map displayed on LCD 15, the user can know that the facility is present on the way to the destination. The user can check the location of the facility present on the way to the destination on the map by changing the map displayed on LCD 15, if necessary.

If facility information is not input from facility extraction portion 109 and if a find instruction is accepted from instruction accepting portion 127, determination portion 115 outputs the find instruction to facility obtaining portion 129.

When the find instruction is input from determination portion 115, facility obtaining portion 129 obtains the facility closest to the present location obtained by present location obtaining portion 101. Specifically, a find request including the present location and the kind of facility is transmitted to the server. Upon receiving the find instruction, the server searches for the facility closest to the present location and sends back the map information including the map including the present location and the location of the facility extracted through the search and the route from the present location to the facility. Facility obtaining portion 129 obtains the map information sent by the server. Facility obtaining portion 129 outputs the map information obtained from the server to display control portion 121. Display control portion 121 receives the map information from facility obtaining portion 129 to display an image including the map and the route included in the map information on LCD 15. Accordingly, the user can watch the image of the map displayed on LCD 15 to check the location of the facility closest from the present location and the route to the facility.

Figure 5:
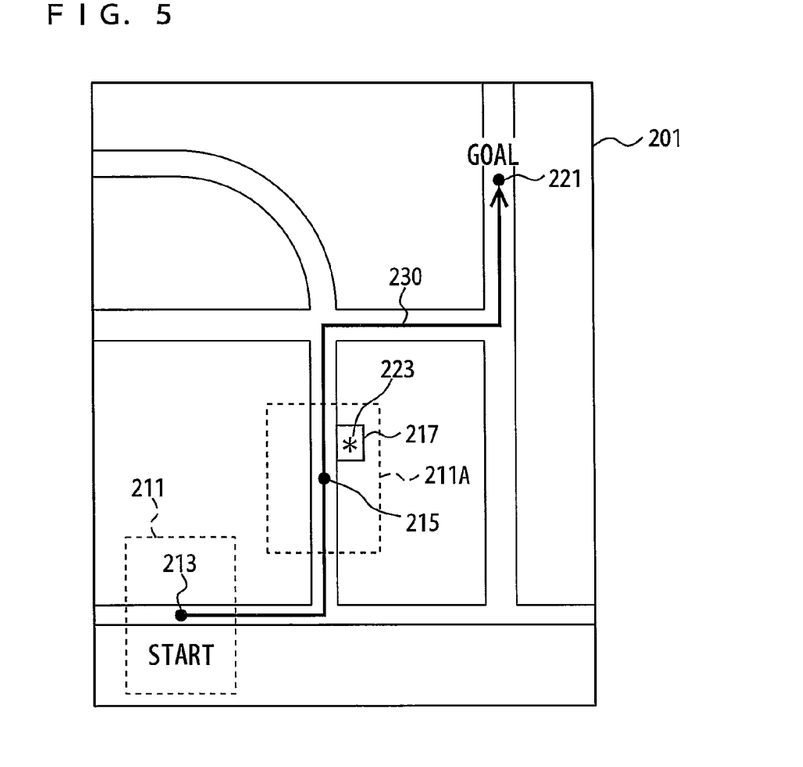
FIG. 5 is an illustration showing the relation between a map included in map information and a display area.

FIG. 5 is an illustration showing the relation between the map included in the map information and the display area. Referring to FIG. 5, the map information includes a map 201 including a point of departure 213 and a point of destination 221, a route 230 from point of departure 213 to point of destination 221, and facility information concerning a facility 217. First, if the present location is point of departure 213, a display area 211 is set and display area 211 is displayed on LCD 15. Multicolor LED 35 does not emit light since facility 217 is not present in display area 211. When the user moves along route 230 and arrives at a location 215, a display area 211A is set and display area 211A is displayed on LCD 15. Multicolor LED 35 blinks at intervals determined by the distance between present location 215 and the location of facility 217. An asterisk (*) mark is displayed as a mark indicating the facility on LCD 15. Therefore, the user can know the presence of the facility immediately by watching the * mark. If the * mark is displayed in a predetermined color such as red, the facility in the map can be found easily.

Figure 6:
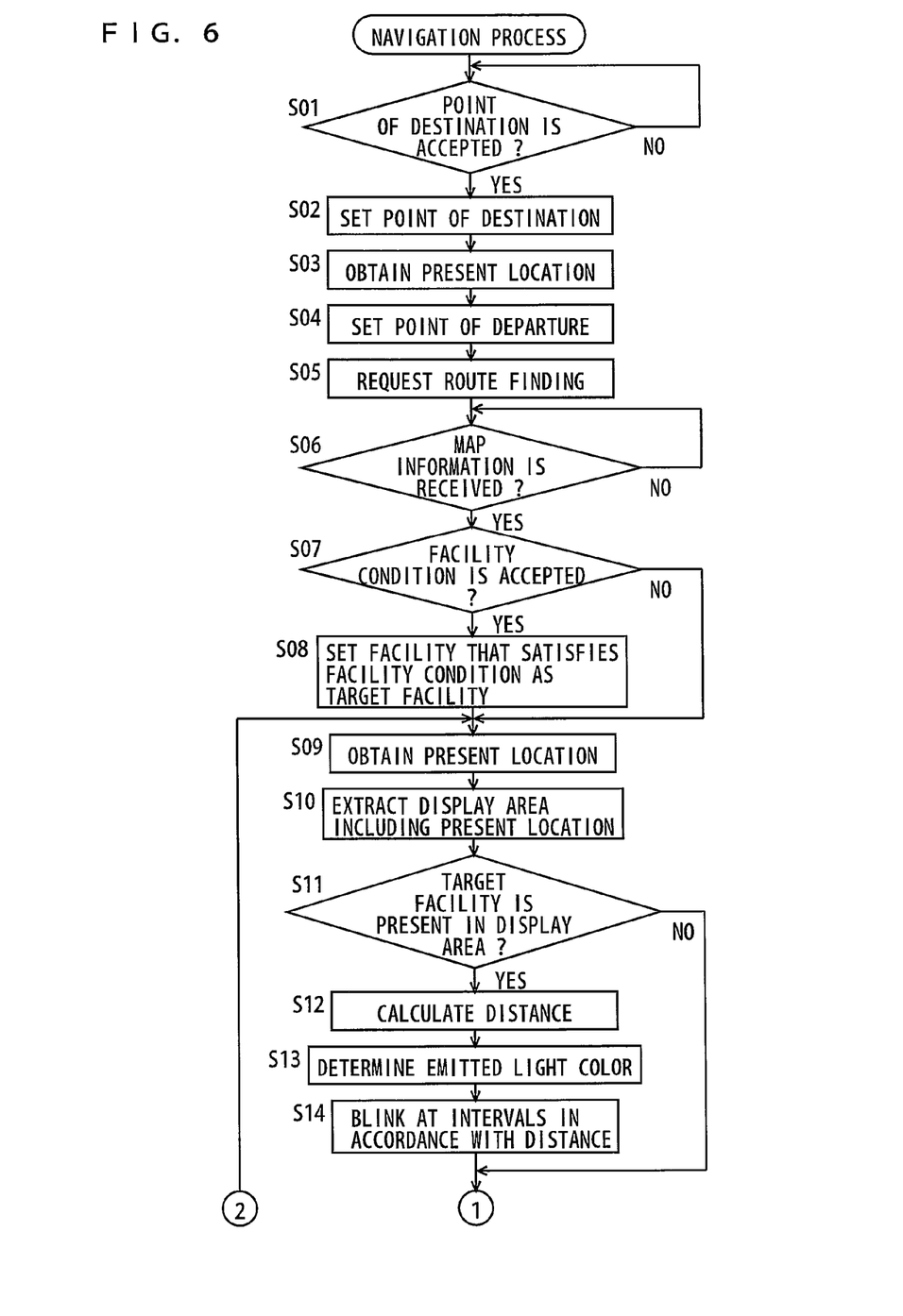
FIG. 6 is a first flowchart showing an exemplary flow of a navigation process.
Figure 7:
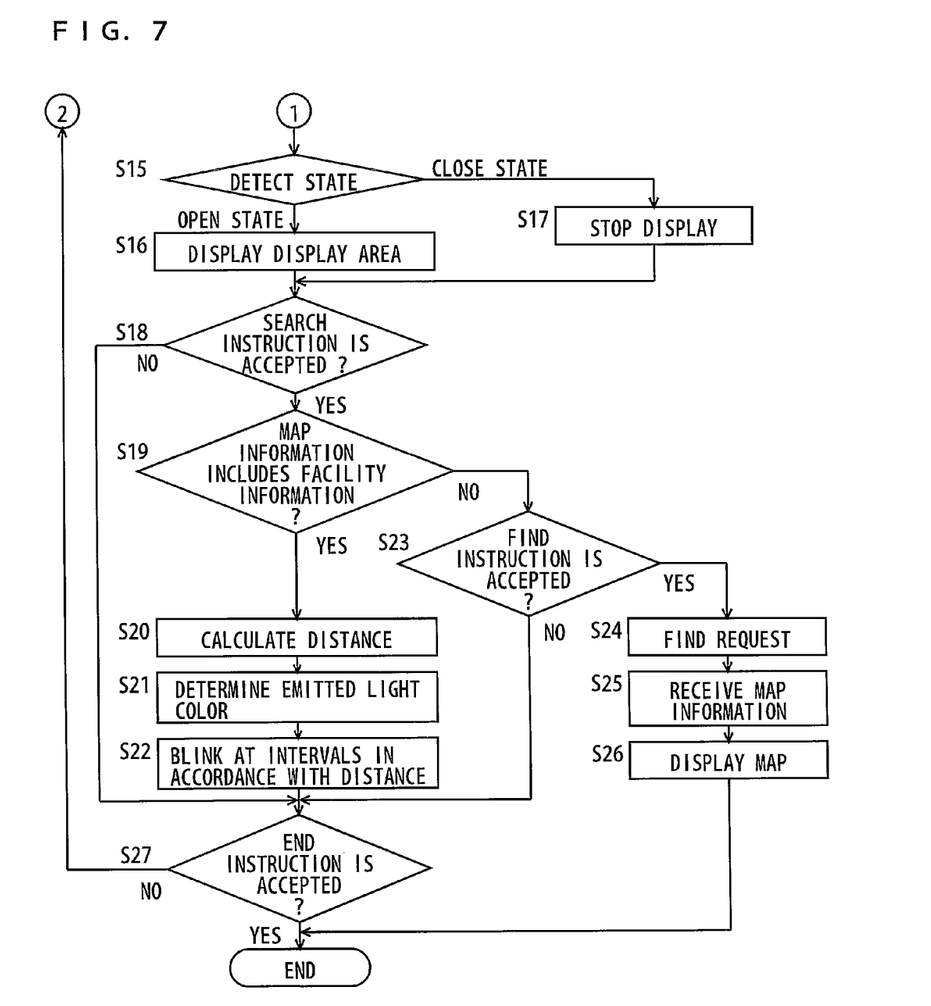
FIG. 7 is a second flowchart showing an exemplary flow of a navigation process.

FIG. 6 and FIG. 7 are flowcharts showing an exemplary flow of a navigation process. The navigation process is a process executed by control portion 21 when control portion 21 executes a navigation program. Referring to FIG. 6 and FIG. 7, control portion 21 determines whether a point of destination is accepted or not (step S01). The process waits until a point of destination is accepted (NO in step S01), and if a point of destination is accepted (YES in step S01), the process proceeds to step S02. A map and a pointer are displayed on LCD 15, and the user operates operation key 14 to move the pointer and, if necessary, switch the displayed map, whereby a location in the map is accepted.

In step S02, the location accepted in step S01 is set as a point of destination. Then, the present location is obtained (step S03). The present location is obtained based on a signal received by GPS sensor 38 from a satellite. In the next step S04, the present location obtained in step S03 is set as a point of departure. In the next step S05, a request for route finding is transmitted to the server. The request for route finding includes the point of departure and the point of destination. The process waits until the map information sent back from the server is received (NO in step S06), and if the map information is received (YES in step S06), the process proceeds to step S07.

In step S07, a facility condition is accepted. Then, a facility that satisfies the facility condition accepted in step S07 is set as a target facility from among the facilities specified by the facility information included in the map information received in step S06 (step S08). The facility condition includes at least one of the kind of facility and the presence in a prescribed range from either the point of departure or the point of destination. Here, the kind of facility "convenience store" is set as a facility condition. In this case, the facility information in which the kind of facility is set as "convenience store" is extracted from among facility information, and the facility specified by the extracted facility information is set as a target facility.

In the next step S09, the present location is obtained similarly to step S03. Then, a display area including the present location is extracted from the map included in the map information received in step S06 (step S10). The display area including the present location is an area defined based on the present location, for example, an area that includes the present location at the center and extends in a prescribed range from the present location. Then, it is determined whether the target facility set in step S08 is present in the extracted display area (step S11). If the target facility is present in the display area, the process proceeds to step S12. If not present, the process proceeds to step S15.

In step S12, the distance from the present location obtained in step S09 to the target facility extracted in step S10 is calculated. Then, the predetermined emitted light color is determined corresponding to the kind of facility set by the facility condition (step S13). Furthermore, multicolor LED 35 is allowed to blink in the emitted light color determined in step S13 at intervals in accordance with the distance calculated in step S12 (step S14).

In step S15, the state of mobile phone 1 is detected. If the state of mobile phone 1 is the open state in the open style, the process proceeds to step S16. If the state of mobile phone 1 is in the closed state in the closed style, the process proceeds to step S17. In step S16, the display area extracted in step S10 is displayed on LCD 15, and the process then proceeds to step S18. In this case, if multicolor LED 35 does not emit light (blink), the display area is displayed as it is. If multicolor LED 35 emits light (blinks), in other words, if the facility is present in the display area, the display manner of the display area is changed to the one different from the usual. The display manner different from the usual is to display the * mark superimposed on the location of the facility in the display area. Furthermore, the display area may be displayed three-dimensionally, or the neighborhood of the location of the facility included in the display area may be displayed in an enlarged view. In addition, a photograph of the facility may be downloaded from the server and displayed. In the case where the facility is present in the display area, when mobile phone 1 changes from the closed style to the open style, the map of the neighborhood of the facility is displayed three-dimensionally, or in an enlarged view, or a photograph of the facility is displayed, thereby clearly notifying the user that the facility is present. Therefore, the user can easily find out the actual facility by referring to the image displayed on LCD 15. On the other hand, in step S17, display on LCD 15 is stopped, and the process proceeds to step S18.

In step S18, it is determined whether a search instruction is accepted or not. If a search instruction is accepted, the process proceeds to step S19. If not, the process proceeds to step S27. In step S19, it is determined whether the map information received in step S06 includes the facility information in which the kind of facility set as a facility condition is defined. In other words, it is determined whether the facility corresponding to the kind of facility set as a facility condition is present in the map included in the map information. If the map information includes at least one facility information in which the facility corresponding to the kind of facility set as a facility condition is defined, that facility information is extracted, and the process then proceeds to step S20. If not, the process proceeds to step S22.

In step S20, the distance from the present location to the facility of the facility information extracted in step S19 is calculated. Then, a predetermined emitted light color corresponding to the kind of facility defined by the facility condition is determined for the facility information extracted in step S19 (step S21). Furthermore, multicolor LED 35 is allowed to blink in the emitted light color determined in step S21, at intervals in accordance with the distance calculated in step S20 (step S22). On the other hand, in step S23, it is determined whether a find instruction is accepted or not. If a find instruction is accepted, the process proceeds to step S24. If not, the process proceeds to step S27.

In step S27, it is determined whether an end instruction is accepted or not. If the user presses an end key predetermined in operation key 14, an end instruction is accepted. If an end instruction is accepted, the process ends. If not, the process returns to step S09.

On the other hand, in step S24, a find request is transmitted to the server. The find request includes the present location and the kind of facility. Upon receiving the find request, the server searches for the facility closest from the present location and sends back map information including a map including the present location and the location of the facility and a route from the present location to the facility. In step S25, the map information sent by the server is received. Then, the map of the map information received from the server is displayed on LCD 15 (step S26), and the process then ends. In this case, the * mark indicating the facility and the route to the facility are displayed in such a manner that they are superimposed on the map.

Although in the present embodiments, W-CDMA has been described as an example of network, a network in accordance with the PDC (Personal Digital Cellular) method, the GSM (Global System for Mobile) method, or the CDMA (Code Division Multiple Access) method, or a PHS (Personal Handyphone System) network may be employed.

As described above, mobile phone 1 in the present embodiment, which functions as a navigation apparatus, extracts facility information of the facility located in the neighborhood of the route from a point of departure to a point of destination, from among facility information included in the map information obtained from the server executing route finding or by route finding executed by the mobile phone itself, and if at least one facility information is present in the display area displayed on LCD 15, mobile phone 1 gives notification of the presence of the facility by allowing multicolor LED 35 to emit light. Therefore, when the facility comes into a prescribed range from the user's present location, multicolor LED 35 emits light to make the user know the presence of the facility without watching the map displayed on LCD 15. In addition, multicolor LED 35 is provided on the outer surface of display-side portion 2 to allow the user to visually recognize that multicolor LED 15 emits light and to know the presence of the facility even when mobile phone 1 is in the closed style. Moreover, light emission by multicolor LED 15 can prevent an influence on people around, because people around do not catch a sound as is the case with notification by voice.

Furthermore, if the user sets the kind of facility as a facility condition, multicolor LED 35 blinks when the facility of that kind is present within a prescribed range from the present location, thereby notifying the user only when the facility of the kind desired by the user is present within a prescribed range from the user's present location. In addition, if the user sets either a point of departure or a point of destination as a facility condition, the user can be notified only when the facility located within a prescribed range from the set point of departure or point of destination is present in a prescribed range (within a display area) from the user's present location. Therefore, the user can know the presence of the facility close to a point of departure or close to a point of destination.

Furthermore, if the user inputs a search instruction to mobile phone 1, even when the facility is not present within a prescribed range (within a display area) from the user's present location, multicolor LED 35 blinks if the facility is present in the neighborhood of the route from a point of departure to a point of destination. Therefore, the user can be notified that the facility is present on the way from the point of departure to the point of destination, at a timing desired by the user. The user can know the presence of the facility, especially, in urgent need.

Furthermore, even when the facility is not present in the neighborhood of the route from the point of departure to the point of destination, if the user inputs a find instruction to mobile phone 1, the map information including the facility located in the neighborhood of the present location is obtained, and the map is displayed. Therefore, the user can know the facility present in the neighborhood of the present location, irrespective of the point of destination.

Furthermore, when the user performs a simple operation of changing the state of mobile phone 1 from the closed style to the open style, an image of a map in the display area appears on LCD 15, which eliminates the need of a special operation and simplifies the operation. On the other hand, in the closed style, the driving of LCD 15 is stopped, thereby reducing power consumption. When a display area is displayed on LCD 15, mobile phone 1 displays a display area including a route to the destination if multicolor LED 35 does not emit light (blink), and changes the display manner of the display area to the one different from the usual if multicolor LED 35 emits light (blinks), in other words, if the facility is present in the display area. The display manner different from the usual is to display an * mark superimposed on the location of the facility in the display area. Two-dimensional display may be replaced with three-dimensional display, or the neighborhood of the location of the facility included in the display area may be displayed in an enlarge view, or a photograph of the facility may be downloaded from the server and displayed. This can notify the user clearly that the facility is present, and in addition, allows the user to easily grasp the location of the facility, so that the user can easily find out the actual facility.

Although in the present embodiment mobile phone 1 has been described as an example of the navigation apparatus, the present invention is applicable to any device, for example, such as PDA (Personal Digital Assistants) or a car navigation system as long as it can obtain the present location and communicate with the server. It is needless to say that the present invention can be understood as a navigation method for executing the navigation process shown in FIG. 6 and FIG. 7 and a navigation program for allowing a computer to execute the navigation method.

The embodiment disclosed here should be understood as being illustrative rather than being limitative in all respects. The scope of the present invention is shown not in the foregoing description but in the claims, and it is intended that all modifications that come within the meaning and range of equivalence to the claims are embraced here.

The invention claimed is:

1. A navigation apparatus comprising:
a location obtaining portion to obtain a present location;
a destination point setting portion to set a point of destination;
a departure point setting portion to set a point of departure;
a facility extraction portion to, at prescribed time intervals, extract facility information of a facility located in a neighborhood of a route from said point of departure to said point of destination from among facility information included in map information; and
a notification portion to give notification at a prescribed timing if at least one facility information is extracted by said facility extraction portion,
wherein said notification portion includes a light emission portion capable of emitting light and a light emission control portion to allow said light emission portion to blink at intervals determined based on a distance between said obtained present location and a facility, located in a neighborhood of the route, determined by said facility information extracted by said facility extraction portion.

2. The navigation apparatus according to claim 1, wherein said notification portion gives visual notification.

3. The navigation apparatus according to claim 1, wherein said notification portion gives notification on condition that at least one facility determined by said extracted facility information is located in an area determined based on said obtained present location in a map included in said map information.

4. The navigation apparatus according to claim 1, wherein said notification portion gives notification on condition that at least one facility information that satisfies a prescribed condition exists in said extracted facility information.

5. The navigation apparatus according to claim 4, wherein said prescribed condition is to be located in a prescribed range from said point of departure or said point of destination.

6. The navigation apparatus according to claim 1, further comprising an instruction accepting portion to accept a user's instruction, wherein said notification portion gives notification on condition that said facility information is extracted by said facility extraction portion, in response to acceptance of a first instruction by said instruction accepting portion.

7. The navigation apparatus according to claim 6, further comprising:
a facility obtaining portion to obtain map information including said obtained present location and a facility in response to acceptance of a second instruction by said instruction accepting portion, if said facility information is not extracted by said facility extraction portion; and
a display control portion to display a map included in said obtained map information.

8. The navigation apparatus according to claim 1, further comprising:
a first casing;
a second casing coupled to said first casing so as to be freely opened and closed; and
a display control portion to display an area determined based on said obtained present location in a state in which said first casing and said second casing are open and to stop display of said area determined based on said obtained present location in a state in which said first casing and said second casing are closed.

9. The navigation apparatus according to claim 8, wherein said display control portion displays said area determined based on said obtained present location in a prescribed display manner, in said open state.

10. The navigation apparatus according to claim 9, wherein said prescribed display manner includes three-dimensional display, display in an enlarged view, and a photograph.

11. The navigation apparatus according to claim 8, wherein said display control portion includes a marking portion to mark said at least one facility.

12. The navigation apparatus according to claim 1, further comprising a display control portion to display an area determined based on said obtained present location, wherein said light emission portion is provided separate from said display portion.

13. The navigation apparatus according to claim 1, wherein said light emission control portion further allows said light emission portion to emit light in a predetermined color corresponding to a kind of facility determined by said facility information extracted by said facility extraction portion.

14. The navigation apparatus according to claim 13, further comprising a display control portion to display an area determined based on said obtained present location, wherein said light emission portion is provided separate from said display portion.

15. A navigation method comprising the steps of:
obtaining a present location;
setting a point of destination;
setting a point of departure;
at prescribed time intervals, extracting facility information located in a neighborhood of a route from said point of departure to said point of destination from among facility information included in map information; and
giving notification at a prescribed timing, if at least one facility information is extracted as a result of extraction, by emitting light that blinks at intervals determined based on a distance between said obtained present location and a facility, located in a neighborhood of the route, determined from said extracted facility information.

* * * * *